United States Patent

Fauran et al.

[11] 3,898,241
[45] Aug. 5, 1975

[54] DERIVATIVES OF 3-AMINOCARBONYL-2-OXAZOLIDINONE AND THEIR PROCESS OF PREPARATION

[75] Inventors: Claude P. Fauran; Colette A. Douzon, both of Paris; Gerard J. Huguet, Malesherbes; Guy M. Raynaud, Paris; Claude J. Gouret, Meudon, all of France

[73] Assignee: Delalande S.A., Courbevoie, France

[22] Filed: Mar. 23, 1973

[21] Appl. No.: 344,359

[30] Foreign Application Priority Data
Mar. 24, 1970 France .............................. 70.10453
Feb. 17, 1971 France .............................. 71.05295

[52] U.S. Cl.............................. 260/307 C; 424/272
[51] Int. Cl............................................ C07d 85/28
[58] Field of Search ................................ 260/307 C

[56] References Cited
OTHER PUBLICATIONS
Close, W. J. – J. Am. Chem. Soc. 73, 95–98 (1951).

Primary Examiner—Donald G. Daus
Assistant Examiner—Raymond V. Rush
Attorney, Agent, or Firm—Woodhams, Blanchard and Flynn

[57] ABSTRACT

A compound of the formula

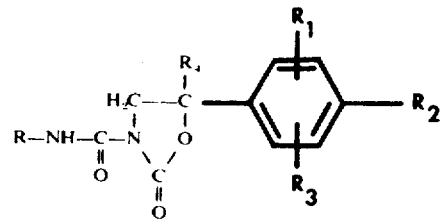

in which $R_4$ is H or phenyl;

R is alkyl or alkenyl having from 1 to 4 carbon atoms; and $R_1$, $R_2$ and $R_3$ are hydrogen, methyl or halogen.

The compound is formed by reacting an isocyanate

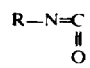

with an oxazolidinone. The compounds possess hypnotic, anti-convulsive, myorelaxant, antidepressive, antiinflammatory, anxiolytic and analgesic properties.

6 Claims, No Drawings

DERIVATIVES OF 3-AMINOCARBONYL-2-OXAZOLIDINONE AND THEIR PROCESS OF PREPARATION

CROSS-REFERENCE TO RELATED APPLICATION

This application is a continuation-in-part of our copending application Ser. No. 127 049, filed Mar. 22, 1971 now U.S. Pat. No. 3,754,000.

This invention relates to novel derivatives of 3-aminocarbonyl-2-oxazolidinone.

The compounds according to the invention have the formula:

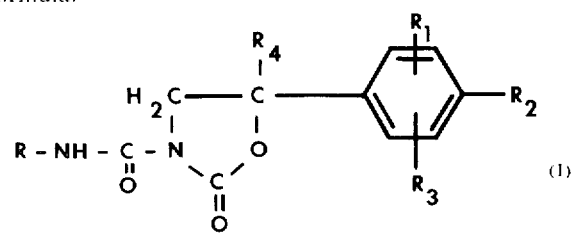

in which:

$R_1$ is hydrogen or phenyl;
R is alkyl or alkenyl having 1 to 4 carbon atoms; and
$R_1$, $R_2$ and $R_3$ are hydrogen, methyl or halogen.

The process for preparing the compounds according to the invention consists in reacting an isocyanate of the formula:

in which R has the same significance as in formula (I), with an oxazolidinone of the formula:

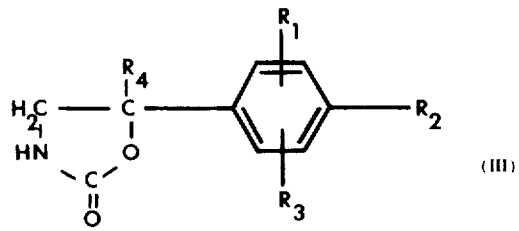

in which $R_4$, $R_1$, $R_2$ and $R_3$ have the same significance as in formula (I).

The following preparations are given by way of non-limitative examples to illustrate the invention.

EXAMPLE I —
3-(n-propylaminocarbonyl)-5-phenyl-2-oxazolidinone (Code No. 6913)

43 Grams of 5-phenyl-2-oxazolidinone and 100 ml of propyl isocyanate are introduced into a reaction vessel under pressure. The mixture is heated with agitation for 1 hour at 140°C. After cooling, the product obtained is dissolved in 150 ml of absolute ethanol and the mixture is boiled for 1 hour. After removal of the alcohol, an oily residue is obtained which is purified by distillation. The propylurethane layer (boiling point = 80°C under 2 mmHg) is removed and the desired product is then recovered.

| | | |
|---|---|---|
| Boiling point | = | 180°C under 0.04 mmHg |
| Melting point | = | 30°C |
| Yield | = | 90% |
| Empirical formula | = | $C_{13}H_{16}N_2O_3$ |

| Elementary analysis | C | H | N |
|---|---|---|---|
| Calculated % | 62.89 | 6.50 | 11.28 |
| Found % | 63.07 | 6.48 | 11.08 |

EXAMPLE II —
3-(n-propylaminocarbonyl)-5,5-diphenyl-2-oxazolidinone (Code No. 69271)

60 Grams of 5,5-diphenyl-2-oxazolidinone and 60 ml of propyl isocyanate are introduced into a reaction vessel under pressure. The mixture is heated at 170°C with agitation for 1 hour. After cooling, the product obtained is treated with 200 ml of ethanol with heating. The product crystallizes and is purified by recrystallization in 96° alcohol.

| | | |
|---|---|---|
| Melting point | = | 89°C |
| Yield | = | 74% |
| Empirical formula | = | $C_{19}H_{20}N_2O_3$ |

| Elementary analysis | C | H | N |
|---|---|---|---|
| Calculated % | 70.35 | 6.22 | 8.64 |
| Found % | 70.15 | 6.16 | 8.73 |

The compounds listed in the following tables I, II and III have been prepared in accordance with the invention.

Table I

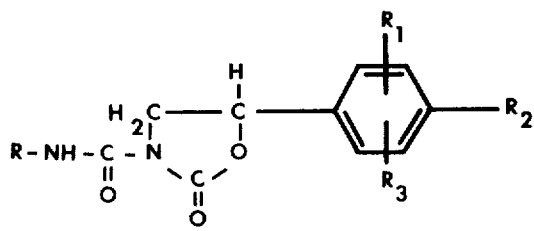

| | | | | | | | | | | | |
|---|---|---|---|---|---|---|---|---|---|---|---|
| | | | | | | | | | $R_1=R_2=R_3=H$ | | |
| Code No. | R | Empirical formula | Molecular Weight | Yield (%) | Melting point (°C) | calculated % C | H | N | found % C | H | N |
| 69255 | $CH_3-$ | $C_{11}H_{12}N_2O_3$ | 220.22 | 60 | 80 | 59.99 | 5.49 | 12.72 | 60.05 | 5.69 | 12.91 |
| 69261 | $C_2H_5-$ | $C_{12}H_{14}N_2O_3$ | 234.25 | 70 | 74 | 61.52 | 6.02 | 11.96 | 61.36 | 5.99 | 11.93 |
| 69260 | $C_3H_7(iso)-$ | $C_{13}H_{16}N_2O_3$ | 248.27 | 65 | 78 | 62.89 | 6.50 | 11.28 | 62.81 | 6.42 | 11.39 |
| 69259 | $CH_2-CH=CH_2$ | $C_{13}H_{14}N_2O_3$ | 246.26 | 62 | 40 | 63.40 | 5.73 | 11.38 | 63.41 | 5.80 | 11.53 |
| 69256 | $C_4H_9(n)-$ | $C_{14}H_{18}N_2O_3$ | 262.30 | 70 | 60 | 64.10 | 6.92 | 10.68 | 64.22 | 4.96 | 10.73 |

Table II

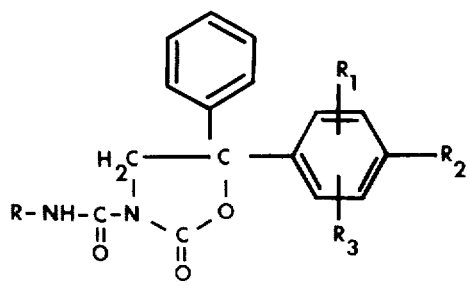

| Code No. | R | Empirical formula | Molecular weight | Yield (%) | Melting point (°C) | $R_1=R_2=R_3=H$ Elementary analysis calculated % C | H | N | found % C | H | N |
|---|---|---|---|---|---|---|---|---|---|---|---|
| 69286 | $C_2H_5-$ | $C_{18}H_{18}N_2O_3$ | 310.34 | 80 | 116 | 69.66 | 5.85 | 9.03 | 69.61 | 5.81 | 9.29 |
| 69264 | $C_3H_7(iso)-$ | $C_{19}H_{20}N_2O_3$ | 324.37 | 88 | 142 | 70.35 | 6.22 | 8.64 | 70.26 | 6.14 | 8.65 |
| 69265 | $CH_2=CH-CH_2-$ | $C_{19}H_{18}N_2O_3$ | 322.35 | 85 | 96 | 70.79 | 5.63 | 8.69 | 70.69 | 5.55 | 8.78 |
| 69277 | $C_4H_9(n)-$ | $C_{20}H_{22}N_2O_3$ | 338.39 | 82 | 110 | 70.98 | 6.55 | 8.28 | 71.19 | 6.55 | 8.53 |

Table III

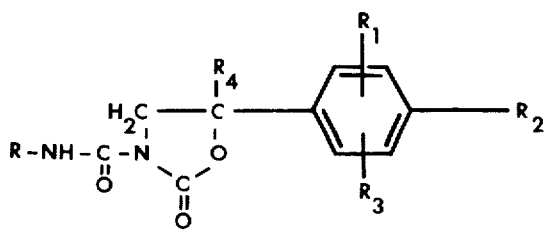

| Code No. | R | $R_1$ | $R_2$ | Empirical formula | Molecular weight | Melting point (°C) | Yield (%) | $R_4=H$ Elementary analysis calculated % C | H | N | found % C | H | N |
|---|---|---|---|---|---|---|---|---|---|---|---|---|---|
| 70276 | $C_2H_5$ | H | 4—$CH_3$ | $C_{13}H_{16}N_2O_3$ | 248.27 | 70 | 56 | 62.89 | 6.50 | 11.28 | 62.71 | 6.21 | 11.47 |
| 70271 | $C_3H_7(n)$ | H | 4—$CH_3$ | $C_{14}H_{18}N_2O_3$ | 262.30 | 50 | 69 | 64.10 | 6.92 | 10.68 | 64.25 | 6.96 | 10.80 |
| 70268 | $C_3H_7(iso)$ | H | 4—$CH_3$ | $C_{14}H_{18}N_2O_3$ | 262.30 | 60 | 69 | 64.10 | 6.92 | 10.68 | 64.29 | 6.94 | 10.58 |
| 70256 | $C_2H_5$ | H | 4—Cl | $C_{12}H_{13}Cl N_2O_3$ | 268.70 | 80 | 76 | 53.64 | 4.88 | 10.43 | 53.69 | 4.86 | 10.41 |
| 70266 | $C_3H_7(n)$ | H | 4—Cl | $C_{13}H_{15}Cl N_2O_3$ | 282.72 | 50 | 78 | 55.22 | 5.35 | 9.91 | 55.30 | 5.18 | 9.95 |
| 70267 | $C_3H_7(iso)$ | H | 4—Cl | $C_{13}H_{15}Cl N_2O_3$ | 282.72 | 75 | 83 | 55.22 | 5.35 | 9.91 | 55.37 | 5.17 | 10.10 |
| 70237 | $C_2H_5$ | 3—Cl | 4—Cl | $C_{12}H_{12}Cl_2N_2O_3$ | 303.15 | 112 | 78 | 47.54 | 3.99 | 9.24 | 47.72 | 3.88 | 9.44 |
| 70252 | $C_3H_7(n)$ | 3—Cl | 4—Cl | $C_{13}H_{14}Cl_2N_2O_3$ | 317.17 | 72 | 50 | 49.24 | 4.45 | 8.83 | 49.44 | 4.43 | 8.98 |
| 70255 | $C_3H_7(iso)$ | 3—Cl | 4—Cl | $C_{13}H_{14}Cl_2N_2O_3$ | 317.17 | 82 | 66 | 49.24 | 4.45 | 8.83 | 49.21 | 4.49 | 9.02 |
| 70273 | $C_2H_5$ | H | 4—F | $C_{12}H_{13}F N_2O_3$ | 252.24 | 70 | 86 | 57.14 | 5.20 | 11.11 | 57.30 | 5.24 | 11.16 |
| 70274 | $C_3H_7(n)$ | H | 4—F | $C_{13}H_{15}F N_2O_3$ | 266.27 | 45 | 78 | 58.64 | 5.68 | 10.52 | 58.50 | 5.68 | 10.68 |
| 70279 | $C_3H_7(iso)$ | H | 4—F | $C_{13}H_{15}F N_2O_3$ | 266.27 | 45 | 64 | 58.64 | 5.68 | 10.52 | 58.50 | 5.87 | 10.71 |
| 70259 | $C_2H_5$ | 3—F | H | $C_{12}H_{13}F N_2O_3$ | 252.24 | 57 | 93 | 57.14 | 5.20 | 11.11 | 57.34 | 5.06 | 11.28 |
| 70277 | $C_3H_7(n)$ | 3—F | H | $C_{13}H_{15}F N_2O_3$ | 266.27 | 45 | 66 | 58.64 | 5.68 | 10.52 | 58.84 | 5.69 | 10.66 |
| 70275 | $C_3H_7(iso)$ | 3—F | H | $C_{13}H_{15}F N_2O_3$ | 266.27 | 50 | 79 | 58.64 | 5.68 | 10.52 | 58.80 | 5.66 | 10.65 |

The compounds of formula (I) have been tested on animals in the laboratory and have shown to possess in particular hypnotic, anticonvulsant, myorelaxant, anti-depressive, anti-inflammatory, anxiolytic and analgesic properties.

I - Anticonvulsant properties

The compounds of formula (I) possess inhibiting properties, when administered by oral means, on the mortality provoked in mice by the administration of convulsant agents such as strychnine, cardiazol and nicotine. As well, they inhibit, when administered by oral means, the tonic convulsions provoked by a supra-maximal electric shock on rats and mice.

By way of example, the results obtained with a certain number of compounds of formula (I) are listed in the following Table IV:

Table IV

| Code No. | Dose administered (mg/kg/PO) | Percentage protection against | | | electric shock | |
|---|---|---|---|---|---|---|
| | | nicotine (mouse) | strychnine (mouse) | cardiazol (mouse) | (rat) | (mouse) |
| 6913 | 75 | 78 | 100 | | | 50 |
| | 150 | | | 80 | | |
| 69255 | 150 | 90 | 100 | 80 | 80 | 60 |
| 69256 | 200 | 100 | 100 | 60 | | |
| 69259 | 50 | | 90 | | | |
| 69260 | 200 | 90 | 100 | 100 | 70 | 70 |
| 69261 | 150 | 65 | 100 | 80 | 100 | 80 |
| 70237 | 100 | | | | | 50 |
| 70252 | 100 | | | | | 70 |
| 70273 | 100 | | | 85 | | |
| 70274 | 100 | | | 50 | | |

II - Myorelaxant properties

Such properties are shown by an incapacity to execute reestablishment movements on a horizontally suspended metallic bar (traction test), in mice and rats having received, by oral means, the compounds of formula (I).

By way of example, the results obtained with a certain number of compounds of formula (I) are listed in the following Table V:

Table V

| Code No. | Dose administered (mg/kg/PO) | | Percentage inhibition |
|---|---|---|---|
| | rats | mice | |
| 69255 | 300 | | 90 |
| 69256 | 400 | | 70 |
| 69259 | 100 | | 100 |
| 69260 | 400 | | 80 |
| | | 400 | 100 |
| 69261 | 300 | | 90 |
| | | 230 | 50 |
| 6913 | 150 | | 20 |
| | | 230 | 50 |

III - Antidepressive properties

The compounds of formula (I) inhibit, when administered by oral means, in rats, gastric ulcerations and ptosis and, in mice, hypothermia and ptosis, produced by the administration of reserpine.

By way of example, the results obtained with a certain number of compounds of formula (I) are listed in the following Table VI:

Table VI

| Code No. | Dose administered | Animal treated | Reduction of | | |
|---|---|---|---|---|---|
| | | | Gastric ulcerations | Palpebral ptosis | Hypothermia |
| 6913 | 75 mg/kg/PO | mouse | | | 4% |
| | 150 mg/kg/PO | rat | 40% | 55% | |
| | | mouse | | | 40% |
| 70259 | 100 mg/kg/PO | rat | | 65% | |
| 70275 | 100 mg/kg/PO | rat | | 40% | |
| 70277 | 100 mg/kg/PO | rat | | 55% | |

As a result of the values shown above and those shown in the following Table X, the difference between the pharmacologically active dose and the lethal dose is sufficiently great to permit the compounds of formula (I) to be utilized in therapeutics.

IV — Antiinflammatory properties

Such properties are shown by a diminution of the local oedema provoked by the under-planatary injection of a phlogogenic agent such as carraghenine, in rats followed by the oral administration of the compounds of formula (I).

By way of example, the results obtained with a certain number of compounds of formula (I) are listed in the following Table VII:

Table VII

| Code No. | Dose administered (mg/kg/PO) | Percentage Protection |
|---|---|---|
| 69255 | 150 | 40 |
| 69260 | 200 | 35 |
| 69261 | 150 | 42 |
| 69265 | 200 | 45 |
| 70273 | 100 | 55 |
| 70274 | 100 | 60 |

V — Anxiolytic properties

The compounds of formula (I) possess augmentative properties when administered by oral means, of the number of performances of mice subjected to a test with four plates.

The results obtained with a certain number of compounds of formula (I) are listed in the following Table VIII, the dose administered being 100 mg/kg/PO.

Table VIII

| Code No. of compound tested | Increase in No. of performances in test with four plates |
|---|---|
| 70273 | 65% |
| 70274 | 100% |
| 70252 | 55% |

VI — Analgesic properties

The compounds of formula (I) administered by oral means in mice, are capable of reducing the number of consecutive painful stretchings produced by the intraperitoneal injection of phenylbenzoquinone.

By way of example, the diminution of the painful stretchings produced by the administration of 100 mg/kg/PO of compound nos. 70256 and 70267 is 40 percent and 45 percent respectively.

As a result of the values shown above and those shown in the following Table X, the difference between the pharmacologically active dose and the lethal dose is sufficiently great to permit the compounds of formula (I) to be utilized in therapeutics.

VII — Hypnotic properties

The compounds of formula I administered intraperitoneally to mice reduce the ability of the animal to regain an upright posture when placed on its back (righting reflex).

The results obtained using representative compounds of of the formula (I) are listed in the following Table IX. The table also lists the result obtained using a control compound.

Table IX

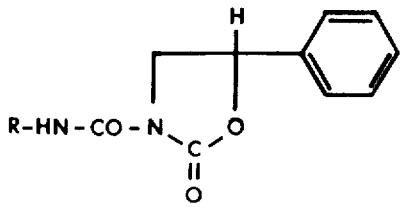

Table IX - CONTINUED

| Compounds tested | | Toxicity LD 50 | Dose administered | Percentage of mice losing the righting reflex |
|---|---|---|---|---|
| Code No. | R | mg/kg/p.o. | | |
| 69 255 | —$CH_3$ | 1 650 | 600 mg/kg p.o. | 50% |
| 69 261 | —$C_2H_5$ | 1 500 | 750 mg/kg p.o. | 50% |
| 6 913 | —$nC_3H_7$ | 1 300 | 300 mg/kg p.o. | 50% |
| 69 260 | iso $C_3H_7$ | 2 000 | 650 mg/kg p.o. | 50% |
| 69 259 | —$CH_2$—$CH=CH_2$ | 850 | 400 mg/kg p.o. | 50% |
| 69 256 | —n $C_4H_9$ | 2 200 | 1450 mg/kg p.o. | 50% |
| Control | H | 1 400 | 800 mg/kg p.o. | 10% |

Table X

| Code No. of compound tested | Toxicity approaching LD 50 (mouse) (in mg/kg/PO) |
|---|---|
| 6913 | 1300 |
| 69255 | 1650 |
| 69256 | 2200 |
| 69259 | 850 |
| 69260 | 2000 |
| 69261 | 1500 |
| 69265 | >4000 |
| 69270 | 2300 |
| 70259 | 2000 |
| 70277 | 1900 |
| 70275 | 2100 |
| 70273 | 1300 |
| 70274 | 2400 |
| 70256 | 2000 |
| 70267 | 2600 |
| 70237 | 2500 |
| 70252 | >2000 |

The compounds of formula (1) are useful in the treatment of depressions, anxiety, epilepsy and painful contractions and inflammations.

They are administered by oral means in the form of tablets, sugar-coated pills and gelules containing 50 to 400 mg of active ingredient (1 to 6 times per day) and by rectal means in the form of suppositories containing 50 to 300 mg of active ingredient (1 or 2 times per day).

The embodiments of the invention in which an exclusive property or privilege is claimed are defined as follows:

1. A compound of the formula

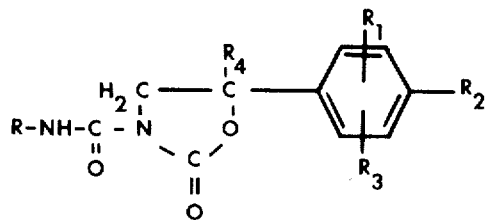

wherein
$R_4$ is H or phenyl;
R is alkyl or alkenyl of 1 to 4 carbon atoms; and
$R_1$, $R_2$ and $R_3$ are hydrogen, methyl or halogen.

2. A compound according to claim 1, in which R is n-propyl and $R_1$, $R_2$, $R_3$ and $R_4$ each is H.

3. A compound according to claim 1, in which $R_1$, $R_2$, $R_3$ and $R_4$ are hydrogen, and R is selected from the group consisting of methyl, ethyl, isopropyl, n-propyl, allyl and n-butyl.

4. A compound according to claim 1, in which $R_1$, $R_2$ and $R_3$ are hydrogen, $R_4$ is phenyl, and R is selected from the group consisting of ethyl, isopropyl, n-propyl, allyl and n-butyl.

5. A compound according to claim 1, in which $R_1$, $R_3$ and $R_4$ are hydrogen, $R_2$ is selected from the group consisting of methyl, chloro and fluoro, and R is selected from the group consisting of ethyl, n-propyl and isopropyl.

6. A compound according to claim 1, in which $R_3$ and $R_4$ are hydrogen, $R_1$ is selected from the group consisting of 3-Cl and 3-F, $R_2$ is selected from the group consisting of chloro and hydrogen, and R is selected from the group consisting of ethyl, n-propyl and isopropyl, with the proviso that when $R_1$ is 3-Cl, $R_2$ is chloro, and with the further proviso that when $R_1$ is 3-F, $R_2$ is hydrogen.

* * * * *